United States Patent
Sudo et al.

(10) Patent No.: US 10,867,196 B2
(45) Date of Patent: Dec. 15, 2020

(54) ALARM DEVICE

(71) Applicant: AISIN SEIKI KABUSHIKI KAISHA, Kariya (JP)

(72) Inventors: Shinya Sudo, Okazaki (JP); Toshihiko Kuno, Nagoya (JP)

(73) Assignee: AISIN SEIKI KABUSHIKI KAISHA, Kariya (JP)

(*) Notice: Subject to any disclaimer, the term of this patent is extended or adjusted under 35 U.S.C. 154(b) by 100 days.

(21) Appl. No.: 16/099,762

(22) PCT Filed: Mar. 24, 2017

(86) PCT No.: PCT/JP2017/011925
§ 371 (c)(1),
(2) Date: Nov. 8, 2018

(87) PCT Pub. No.: WO2017/208587
PCT Pub. Date: Dec. 7, 2017

(65) Prior Publication Data
US 2019/0122060 A1    Apr. 25, 2019

(30) Foreign Application Priority Data
May 30, 2016    (JP) ................................. 2016-107309

(51) Int. Cl.
*G06K 9/00* (2006.01)
*G08B 21/00* (2006.01)
(Continued)

(52) U.S. Cl.
CPC ........... *G06K 9/00845* (2013.01); *B60Q 9/00* (2013.01); *B60W 50/14* (2013.01);
(Continued)

(58) Field of Classification Search
CPC .. B60K 28/066; B60K 28/02; G06K 9/00845; G06K 9/00288; G06K 9/00838;
(Continued)

(56) References Cited

U.S. PATENT DOCUMENTS

2002/0128774 A1* 9/2002 Takezaki .................. B60Q 9/00
                                                                701/431
2005/0216185 A1    9/2005 Takezaki et al.
(Continued)

FOREIGN PATENT DOCUMENTS

| JP | 4-239999 A | 8/1992 |
|----|------------|--------|
| JP | 9-39657 A  | 2/1997 |

(Continued)

OTHER PUBLICATIONS

International Search Report for PCT/JP2017/011925 dated Jun. 6, 2017 [PCT/ISA/210].
(Continued)

*Primary Examiner* — Brenda C Bernardi
(74) *Attorney, Agent, or Firm* — Sughrue Mion, PLLC

(57) ABSTRACT

An alarm device that can urge changing of a vehicle driver without giving a nuisance to the driver or an occupant of the vehicle includes a captured image acquisition section for acquiring at least a plurality of captured images image-capturing a face of an occupant at a driver's seat of a vehicle, a measuring section for measuring a time period lapsed after starting of an engine of the vehicle, a decision section for deciding presence/absence of changing of the occupant of the driver's seat based on the plurality of captured images acquired, and an informing section for informing if the decision section decides absence of change of the occupant of the driver's seat and a measurement result of the measuring section reaches a preset value.

4 Claims, 2 Drawing Sheets

(51) Int. Cl.
*B60W 50/14* (2020.01)
*B60Q 9/00* (2006.01)
*B60K 28/02* (2006.01)

(52) U.S. Cl.
CPC ..... *G06K 9/00288* (2013.01); *G06K 9/00838* (2013.01); *G08B 21/00* (2013.01); *B60K 28/02* (2013.01)

(58) Field of Classification Search
CPC .......... G08B 21/00; G08B 21/06; B60Q 9/00; B60W 50/14; B60W 2540/043
See application file for complete search history.

(56) References Cited

U.S. PATENT DOCUMENTS

| | | | |
|---|---|---|---|
| 2010/0121502 A1 | 5/2010 | Katayama et al. | |
| 2012/0072097 A1 | 3/2012 | Ohta et al. | |

FOREIGN PATENT DOCUMENTS

| | | |
|---|---|---|
| JP | 2002-254955 A | 9/2002 |
| JP | 2008-213585 A | 9/2008 |
| JP | 2009-255864 A | 11/2009 |
| JP | 2010-113581 A | 5/2010 |
| JP | 2010-169476 A | 8/2010 |
| JP | 2011-001049 A | 1/2011 |
| JP | 2015-087891 A | 5/2015 |

OTHER PUBLICATIONS

Written Opinion for PCT/JP2017/011925 dated Jun. 6, 2017 [PCT/ISA/237].
International Preliminary Report on Patentability with a Translation of Written Opinion issued from the International Bureau in counterpart International Application No. PCT/JP2017/011925, dated Dec. 13, 2018.

* cited by examiner

US 10,867,196 B2

ALARM DEVICE

CROSS REFERENCE TO RELATED APPLICATIONS

This application is a National Stage of International Application No. PCT/JP2017/011925 filed Mar. 24, 2017, claiming priority based on Japanese Patent Application No. 2016-107309 filed May 30, 2016.

TECHNICAL FIELD

The present disclosure relates to an alarm device configured to effect informing according to a driving period (duration) of a driver.

BACKGROUND ART

Driving a vehicle continuously without taking any rest can sometimes result in e.g. deterioration in driver's attention or dozing off. And, such deterioration in driver's attention or dozing off may invite a serious accident. Then, the convention has contemplated techniques that can prevent such accident (e.g. Patent Documents 1 and 2).

An automobile driving management system disclosed in Patent Document 1 is configured such that a traveling time period or a traveling distance is measured and when the measured period or distance reaches a preset value, driving of a vehicle is inhibited within a predetermined rest period. Further, a voice alarm device for an automobile disclosed in Patent Document 2 is configured such that in association with an operation on a switch or the like included in the vehicle, a voice message is outputted via a speaker and such message will be repeated periodically in case a timer function is provided for instance.

BACKGROUND ART DOCUMENTS

Patent Documents

Patent Document 1: Japanese Unexamined Patent Application Publication H4-239999
Patent Document 2: Japanese Unexamined Patent Application Publication H9-39657

SUMMARY

Problems to be Solved by Invention

The technique disclosed in Patent Document 1 is configured to inhibit vehicle driving based on a traveling time period or a traveling distance. So, even if the driver has changed, traveling of the vehicle will be inhibited upon the traveling time period or the traveling distance arriving at the preset value, so the driver may find this a nuisance. Further, according to the technique disclosed in Patent Document 2, in case a timer function is provided, the message will be repeated periodically. Thus, even if the driver has changed, the issuance of message will not be stopped, so the driver may find this a nuisance.

Thus, there is a need for an alarm device that can urge changing of the vehicle driver without giving a nuisance to the driver or an occupant of the vehicle.

Solution

According to a characterizing feature of an alarm device relating to the present disclosure, the alarm device comprises:

a captured image acquisition section for acquiring at least a plurality of captured images image-capturing a face of an occupant at a driver's seat of a vehicle;
a measuring section for measuring a time period lapsed after starting of an engine of the vehicle;
a decision section for deciding presence/absence of changing of the occupant of the driver's seat based on the plurality of captured images acquired; and
an informing section for informing if the decision section decides absence of changing of the occupant of the driver's seat and a measurement result of the measuring section reaches a preset value.

With the above-described characterizing arrangement, based on captured images image-capturing a face of an occupant at a driver's seat of a vehicle and a measurement result of the measuring section, it is possible to decide appropriately whether the driver has driven continuously for a long period of time or not. Therefore, e.g. if the driver has changed after traveling for a long period of time, continuation of informing to the driver can be avoided, thus preventing giving nuisance to the vehicle occupant. Further, since absence of driver changing can also be identified, based on the captured images image-capturing the face of the occupant at the driver's seat of the vehicle, in case the measurement result of the measuring section reaches the preset value after decision of no changing of the driver, it is possible to urge changing of the driver by informing.

Further, preferably, the alarm device further comprises:
a load measurement section for measuring a load acting on the driver's seat; and
an opening/closing detection section for detecting an opening/closing action of a door of the vehicle;
wherein if an opening/closing action of the door is detected and there occurs a change equal to or greater than a preset range in detection results of the load measurement section before and after the opening/closing action of the door, the captured image acquisition section newly acquires a captured image image-capturing the face of the occupant at the driver's seat and the measuring section resets the measurement result and newly effects measurement.

With the above-described arrangement, an opening/closing action of the door of the vehicle and a change in the load at the driver's seat can be utilized as a "trigger" for re-acquisition of captured image of the face of the occupant at the driver's seat. Therefore, there is no need for the captured image acquisition section to continuously capture the image of the face of the occupant at the driver's seat or for the decision section to continuously decide presence/absence of a change of the occupant of the driver's seat. Thus, the calculation load for the alarm device can be reduced advantageously.

Alternatively, the alarm device further comprises:
a load measurement section for measuring a load acting on the driver's seat; and
an opening/closing detection section for detecting an opening/closing action of a door of the vehicle;
wherein if an opening/closing action of the door of the vehicle is detected, the captured image acquisition section newly acquires a captured image image-capturing the face of the occupant at the driver's seat and the measuring section resets the measurement result and newly effects measurement.

With the above-described arrangement, an opening/closing action of the door of the vehicle can be utilized as a "trigger" for re-acquisition of a captured image of the face of the occupant at the driver's seat. Therefore, there is no need for the captured image acquisition section to continuously capture the image of the face of the occupant at the driver's seat or for the decision section to continuously decide presence/absence of a change of the occupant of the driver's seat. Thus, the calculation load for the alarm device can be reduced advantageously.

Preferably, the measuring section resets its measurement result if a preset period has lapsed after stopping of the engine.

With the above-described arrangement, in case the engine has been stopped for a period allowing the driver to take sufficient rest, the measurement result of the measuring section can be reset automatically. Therefore, when the vehicle restarts to travel again, the degree of fatigue of the driver can be newly evaluated.

Preferably, the measuring section resets its measurement result if a predetermined period has lapsed after a shift lever of the vehicle was operated to a parking position or a neutral position or after a parking brake of the vehicle was rendered into a braking state.

With the above-described arrangement, in case the vehicle has not traveled for a period allowing the driver to take sufficient rest, the measurement result of the measuring section can be reset automatically. Therefore, when the vehicle restarts to travel again, the degree of fatigue of the driver can be newly evaluated.

EMBODIMENT

Figure 1:
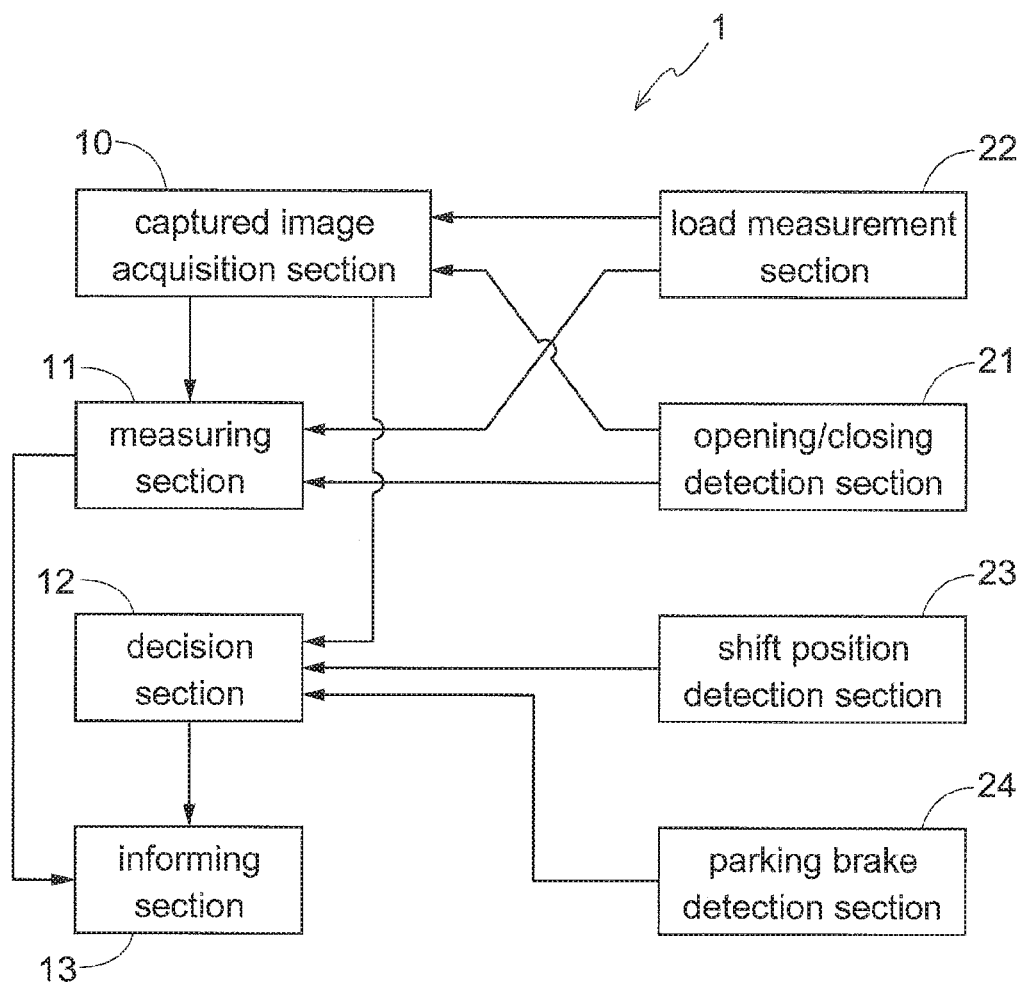
FIG. 1 is a view schematically showing a configuration of an alarm device.

An alarm device relating to this disclosure is configured to urge changing of the driver without giving nuisance to an occupant of a vehicle. Next, an alarm device 1 according to this embodiment will be explained. FIG. 1 is a view schematically showing a configuration of the alarm device 1.

As shown in FIG. 1, the alarm device 1 of this embodiment includes respective functional sections of a captured image acquisition section 10, a measuring section 11, a decision section 12, an informing section 13, a load measurement section 22, an opening/closing detection section 21, a shift position detection section 23, and a parking brake detection section 24.

The respective functional sections described above, in order to execute the process for urging changing of the driver, are constituted of hardware and/or software including a CPU as a core component thereof.

The captured image acquisition section 10 acquires captured image that image-capture a face of an occupant at a driver's seat of the vehicle. Here, "an occupant at a driver's seat of the vehicle" means a person seated at the driver's seat. The captured image acquisition section 10 is constituted of a camera for photographing (image capturing) the face of such person seated at the driver's seat. For appropriate image capturing of the person's face, advantageously, the captured image acquisition section 10 can be disposed e.g. at a top of a column cover which covers a steering column. With this, the captured image acquisition section 10 can appropriately capture image of the face of the occupant at the driver's seat via a hole portion formed in a steering wheel. In this, the captured image acquisition section 10 can be configured to capture the image e.g. when an engine is started or when seating of a person at the driver's seat is detected based on detection result of the load measurement section 22 which will be described later. Further alternatively, the captured image acquisition section 10 can be configured to capture the image when seating of a person at the driver's seat is detected after the engine has been started.

In the instant embodiment, the captured image acquisition section 10 is configured to newly acquire a captured image image-capturing the face of the occupant at the driver's seat if an opening/closing action of the door of the vehicle is detected AND if a change equal to or greater than a preset range is found in detection results of the load measurement section 22 obtained before and after the opening/closing action of the door. Here, "an opening/closing action of the door of the vehicle" refers to an opening/closing action of an access door to the driver's seat of the vehicle, more particularly, a series of actions of opening of the vehicle door and subsequently closing thereof. Such opening/closing action of the vehicle door is detected by the opening/closing detection section 21. The opening/closing detection section 21, upon detection of such opening/closing action of the vehicle door, transmits a signal indicative of occurrence of this opening/closing action to the captured image acquisition section 10.

Here, if a person is seated at the driver' seat, a load will act on the driver's seat. The load measurement section 22 measures such load acting on the driver's seat. As such load measurement section 22, e.g. a piezoelectric sensor can be disposed at the driver's seat and the load can be detected based on an output signal from the piezoelectric sensor. Detection result of this load measurement section 22 is transmitted to the captured image acquisition section 10.

Thus, if the captured image acquisition section 10 receives the signal indicative of occurrence of an opening/closing action of the vehicle door from the opening/closing detection section 21 AND if a change equal to or greater than a preset range is found between detection results of the load measurement section 22 obtained before and after the opening/closing action of the door respectively, the captured image acquisition section 10 newly acquires a captured image image-capturing the face of the occupant at the driver's seat. Here, advantageously, the preset range can be a range greater than an error contained in detection result of the load measurement section 22. The captured image acquired by the captured image acquisition section 10 is transmitted to the decision section 12 which will be described later.

The measuring section 11 measures a time period lapsed after starting of the engine of the vehicle. Here, the engine of the vehicle means a power source for the vehicle. When the engine is started, a signal indicative of the engine being under operation will be transmitted to the measuring section 11 from a controller (not shown) for controlling driving of the engine. Upon receipt of this signal, the measuring section 11 initiates its measurement.

Here, as described above, in case the captured image acquisition section 10 has newly acquired a captured image of the face of the occupant at the driver's seat, the measuring section 11 resets its measurement result and newly effects measurement. The measurement result of the measuring section 11 is transmitted to the informing section 13 which will be described later.

Also, the measuring section 11 resets its measurement result if a preset time period has elapsed after stopping of the engine. In this, as described above, to the measuring section 11, a signal indicative of the engine being under operation is transmitted from the controller which controls driving of the engine. Thus, based on this signal, the measuring section 11 resets its measurement result upon lapse of a preset time period after stopping of the engine. Here, advantageously, "a preset time period" above can be a time period for which it may be reasonably assumed that the driver seated at the driver's seat has taken a sufficient rest although this driver has continued driving.

Further, the measuring section 11 resets its measurement result if a predetermined time period has elapsed after a shift lever of the vehicle was operated to a parking position or a neutral position or after a parking brake of the vehicle was operated to a braking state. Presence of the shift lever of the vehicle at the parking position or the neutral position is detected by the shift position detection section 23. In the above, the language "a parking brake of the vehicle was operated to a braking state" means occurrence of an operation on the parking brake which results in a situation so-called "parking brake applied state". Such state is detected by the parking brake detection section 24. Then, the measuring section 11 resets its measurement result if a predetermined period has lapsed after transmission of detection result indicative to the shift lever of the vehicle being operated to the parking position or the neutral position by the shift position detection section 23 or after transmission of detection result indicative of the parking brake being rendered into the braking state by the parking brake detection section 24. Here, advantageously, "a predetermined time period" can be a time period for which it may be reasonably assumed that the driver seated at the driver's seat has taken a sufficient rest although this driver has continued driving.

The decision section 12 decides, based on the acquired captured images, whether the occupant at the driver's seat has been changed or not. To the decision section 12, the captured images acquired by the captured image acquisition section 10 which image-captures the face of the occupant at the driver's seat are transmitted. Such captured image will be transmitted to the decision section 12 each time the captured image acquisition section 10 acquires it. More particularly, the decision section 12 compares a newest captured image transmitted as above and a captured image which was transmitted in the round immediately preceding the transmission of the newest captured image. If it is found that the occupant's faces shown in these two captured image are identical, then, it is decided that the occupant at the driver's seat has not been changed. Whereas, if it is found that the occupant's faces shown in these two captured image are not identical, then, it is decided that the occupant at the driver's seat has not been changed. Such decision result is transmitted to the informing section 13 which will be described later.

The informing section 13 effects informing if the decision section 12 decides that the occupant at the driver's seat has not been changed AND the measurement result of the measuring section 11 has reaches the preset value. If the decision result transmitted from the decision section 12 is result of decision of the occupant at the driver's seat being not changed AND the measurement result of the measuring section 11 has reaches the preset value, the informing section 13 effects informing to the occupant at the driver's seat to urge taking a rest or changing of the driver. Here, such "preset value" can advantageously be set based on a time period which will provide no or little problem in driving even if the occupant has continued driving. Further, in general, since fatigue of eyes tends to occur during nighttime rather than daytime, such "preset value" can be set shorter for nighttime than for daytime advantageously. And, distinction between daytime driving and nighttime driving can be made based on e.g. a time information included in a GPS signal or can be made based on brightness of the captured images acquired by the captured image acquisition section 10.

Figure 2:
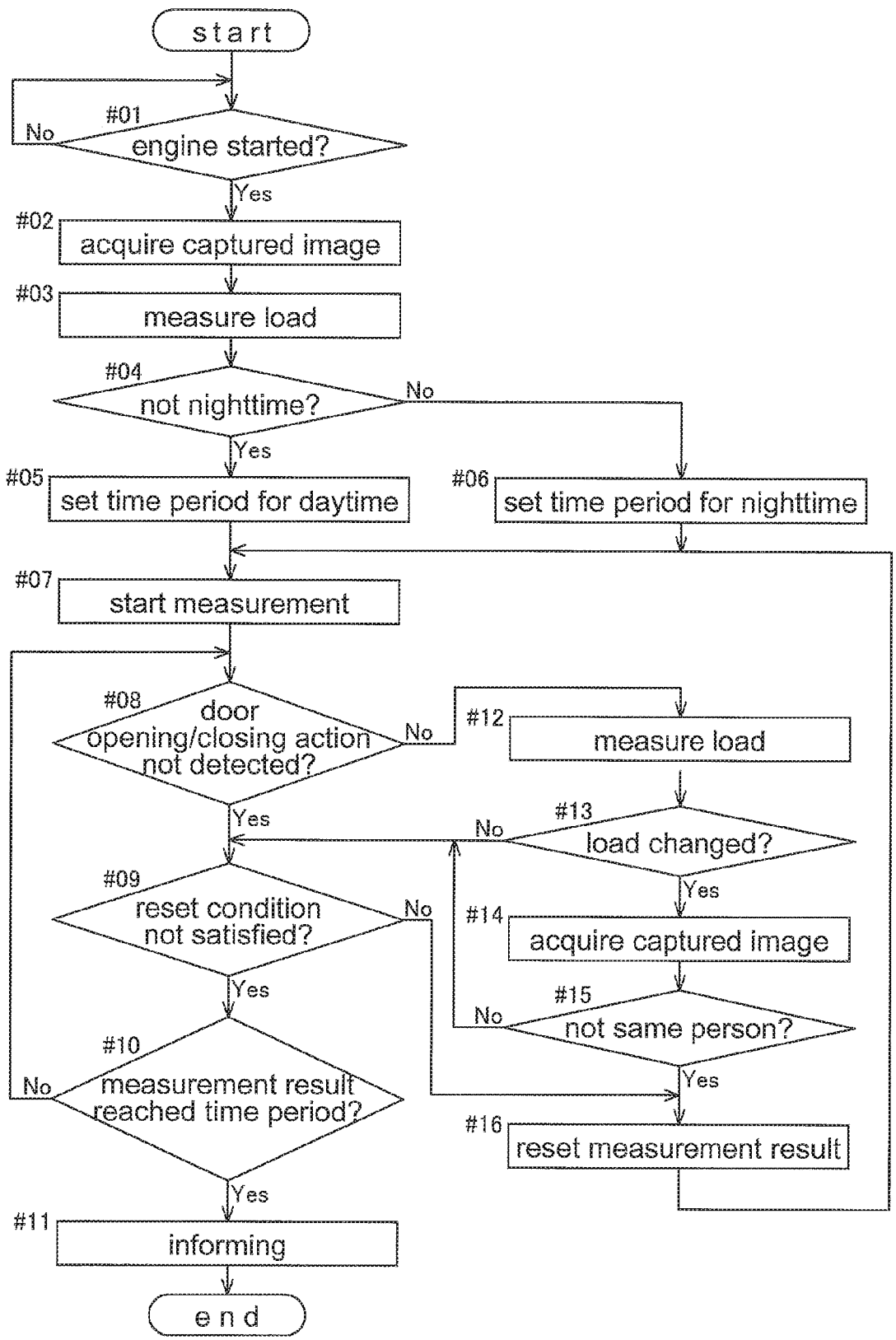
FIG. 2 is a flowchart showing a process effected by the alarm device.

Next, a process relating to the alarm device 1 will be explained with reference to the flowchart in FIG. 2. The alarm device 1 starts this process in association with starting of the engine of the vehicle. When the vehicle engine is started (step #01: YES), the captured image acquisition section 10 obtains a captured image of the face of the occupant at the driver's seat (step #02) and the load measurement section 22 measures a load acting on the driver's seat (step #03).

Next, based on brightness of the captured image acquired by the captured image acquisition section 10, the process decides whether it is now nighttime or not. This decision may be made by the captured image acquisition section 10 or the measuring section 11. Needless to say, it is also possible for such decision to be made by any other functional section. If it is not nighttime now (step #04: YES), the time period (to be referred to as "timer period") to be measured by the measuring section 11 will be set for daytime use (e.g. 2 hours) (step #05). On the other hand, if it is daytime now (step #04: NO), then, the measuring section 11 sets the timer period for nighttime (e.g. 1.5 hours) (step #06). After setting of the timer period at step #05 or step #06, the measuring section 11 starts its measurement (step #07).

If an opening/closing action of the door to the vehicle driver's seat is not detected by the opening/closing detection section 21 (step #08: YES) AND if the predetermined timer reset condition is not satisfied (step #09: YES), AND the measurement result by the measuring section 11 has reached the timer period (step #010: YES), the informing section 13 effects the informing (step #11). Here, "the predetermined timer reset condition" corresponds to "lapse of a preset time period after stopping of the engine" or "lapse of a predetermined time period after the shift lever of the vehicle was operated to the parking position or the neutral position" or "lapse of a predetermined time period after the parking brake of the vehicle was operated to the braking state".

At step #08, if an opening/closing action of the door to the vehicle driver's seat is detected by the opening/closing detection section 21 (step #08: NO), then, the load acting on the driver's seat is newly measured by the load measurement section 22 (step #12). Then, if a change equal to or greater than a preset range is found between this measurement result and a measurement result acquired immediately previously (step #13: YES), the captured image acquisition section 10 newly acquires a captured image of the face of the occupant at the driver' s seat (step #14). Then, based on this newly acquired captured image and the captured image acquired before the implementation of the door opening/closing action, the decision section 12 decides whether the occupant at the driver's seat remains same or not. If not same (step #15: YES), the alarm device 1 decides that the occupant at the driver's seat has been changed. In this case, the measurement result of the measuring section 11 is reset (step #16) and the process at/from step #07 will be continued.

At step #13, if it is found that no change equal to or greater than the preset range is present between the two measurement results obtained by the load measurement section 22 (step #13: NO), then, the process at/from step #09 will be continued. Further, at step #15, if it is decided that the occupant at the driver's seat has remained same before and after the door opening/closing action (step #15: NO), the process at/from step #09 will be continued.

At step #09, if it is found that the predetermined timer rest condition is satisfied (step #09: NO), it is decided that the occupant at the driver's seat has taken sufficient rest, so the process at/from step #016 will be continued.

At step #10, if it is found that the measurement result of the measuring section 11 has not yet reached the timer period (step #10: NO), then, the process will return to step #08 to continue the process. By such process described above, the alarm device 1 urges changing of the driver who has driven for an extended period of time.

Other Embodiments

In the foregoing embodiment, it was explained that if an opening/closing action of the vehicle door is detected and a change equal to or greater than the preset range is present between the measurement results of the load measurement section 22 obtained before and after the door opening/closing action respectively, the captured image acquisition section 10 newly acquires a captured image image-capturing the face of the occupant at the driver's seat and the measuring section 11 rests its measurement result and newly effects measurement. Instead, it is also possible to configure such that irrespectively of detection of the vehicle door opening/closing action, the load measurement section 22 periodically measures a load acting on the driver's seat and if a change equal to or greater than the preset range is present between these measurement results, the captured image acquisition section 10 newly acquires a captured image image-capturing the face of the occupant at the driver's seat and the measuring section 11 resets its measurement result and newly effects measurement.

Further, it is possible to configure such that the captured image acquisition section 10 continuously acquires captured images capturing the face of the occupant at the driver's seat. In this case, it is also possible to configure such that the decision section 12 does not make the decision on the faces shown in the two captured images by comparing the newest captured image transmitted from the captured image acquisition section 10 and a captured image transmitted before the newest captured image, but rather, the decision section 12 makes such decision by comparing the newest captured image transmitted from the captured image acquisition section 10 and a captured image which was acquired a predetermined time period ago (e.g. immediately after the decision of the driver being changed in the newest captured image from that in the previous time).

In the foregoing embodiment, it was explained that the measuring section 11 resets its measurement result after lapse of a preset time period after the engine was stopped. Instead, it is also possible to configure such that the measuring section 11 does not reset its measurement result even after lapse of a preset time period after the engine was stopped.

In the foregoing embodiment, it was explained that the measuring section 11 resets its measurement result after lapse of a predetermined period after the shift lever of the vehicle was operated to the parking positon or the neutral position or after the parking of the vehicle was operated to the braking state. Instead, it is also possible to configure such that the measuring section 11 does not reset its measurement result even after lapse of a predetermined period after the shift lever of the vehicle was operated to the parking positon or the neutral position or after the parking of the vehicle was operated to the braking state.

In the foregoing embodiment, it was explained that the decision section 12 decides whether the occupant at the driver's seat has been changed or not, based on a plurality of captured images acquired. Instead, it is also possible to configure such that the decision section 12 decides that the occupant at the driver's set has not been changed in case such plurality of acquired captured images are not available.

INDUSTRIAL APPLICABILITY

This disclosure is applicable to an alarm device for effecting informing according to driving period (duration) of a driver.

DESCRIPTION OF REFERENCE MARKS/NUMERALS

1: alarm device
10: captured image acquisition section
11: measuring section
12: decision section
13: informing section
22: opening/closing detection section
22: load measurement section

What is claimed is:

1. An alarm device comprising:
   at least one processor configured to implement:
   a captured image acquisition section for acquiring at least a plurality of captured images image-capturing a face of an occupant at a driver's seat of a vehicle;
   a measuring section for measuring a time period lapsed after starting of an engine of the vehicle;
   a decision section for deciding presence/absence of changing of the occupant of the driver's seat based on the plurality of captured images acquired;
   an informing section for informing if the decision section decides absence of changing of the occupant of the driver's seat and a measurement result of the measuring section reaches a preset value;
   a load measurement section for measuring a load acting on the driver's seat; and
   an opening/closing detection section for detecting an opening/closing action of a door of the vehicle,
   wherein if an opening/closing action of the door is detected and there occurs a change equal to or greater than a preset range in detection results of the load measurement section before and after the opening/closing action of the door, the captured image acquisition section newly acquires a captured image image-capturing the face of the occupant at the driver's seat and the measuring section resets the measurement result and newly effects measurement.

2. The alarm device of claim 1, wherein:
   the alarm device further comprises:
   a load measurement section for measuring a load acting on the driver's seat; and
   an opening/closing detection section for detecting an opening/closing action of a door of the vehicle;
   wherein if an opening/closing action of the door is detected, the captured image acquisition section newly acquires a captured image image-capturing the face of the occupant at the driver's seat and the measuring section resets the measurement result and newly effects measurement.

3. The alarm device of claim 1, wherein the measuring section resets its measurement result if a preset period has lapsed after stopping of the engine.

4. The alarm device of claim 1, wherein the measuring section resets its measurement result if a predetermined period has lapsed after a shift lever of the vehicle was operated to a parking position or a neutral position or after a parking brake of the vehicle was rendered into a braking state.

\* \* \* \* \*